United States Patent Office 3,658,889
Patented Apr. 25, 1972

3,658,889
PROCESS FOR THE PREPARATION OF A SALT OF OPTICALLY ACTIVE LYSINE
Geertrudes H. Suverkropp, Geleen, Netherlands, assignor to Stamicarbon N.V., Heerlen, Netherlands
No Drawing. Filed Dec. 16, 1968, Ser. No. 784,223
Claims priority, application Netherlands, Dec. 16, 1967, 6717184
Int. Cl. C07c *101/24*
U.S. Cl. 260—501.11
2 Claims

ABSTRACT OF THE DISCLOSURE

Lysine is optically resolved by forming a salt with phenoxyacetic acid and selectively crystallizing one of the antipodes from a supersaturated solution thereof. The salt of lysine and phenoxyacetic acid is a novel compound.

DETAILED DESCRIPTION OF THE INVENTION

The present invention relates to a process for the preparation of a salt of optically active lysine in which use is made of a method of optical resolution.

Processes of this type are of importance for preparing optically active lysine, the uses of which are well-known, and include additive for foodstuffs.

A well-known method for preparing optically active lysine is the optical resolution of lysine by salt formation with an optically active acid.

However, optically active acids are in general relatively expensive, and there is, furthermore, a real possibility that the optically active acid may be racemized in the course of the process. Accordingly, the known method of optical resolution suffers from distinct disadvantages and is not totally satisfactory.

Accordingly, it is an object of the invention to provide a process which obviates the above noted disadvantages. It is a further object to provide a novel compound of lysine which may be resolved into optical antipodes without the above disadvantages. Other objects will be apparent from the following disclosure and claims. It has now been found that the salt of lysine and phenoxyacetic acid which acid is not optically active can be very readily resolved into its optical antipodes by selectively crystallizing from a supersaturated solution of the salt, one of the optical antipodes. The process according to the invention is, consequently, characterized in that a mixture of optical antipodes of the salt of lysine and phenoxyacetic acid is prepared and an optical resolution is effected by subjecting a supersaturated solution of this salt to selective crystallization and subsequently removing the crystal mass obtained in the latter treatment. The salt of lysine and phenoxyacetic acid is a novel compound, which can be obtained by any desired method. Hence the novel compound may be prepared by reaction of lysine with phenoxyacetic acid in an aqueous medium or by reaction of a salt of phenoxyacetic acid with lysine or by reaction of phenoxyacetic acid with a salt of lysine. For example, the ammonium salt of phenoxyacetic acid is reacted with an aqueous lysine solution followed by removal of the ammonia or lysine carbonate is reacted with phenoxyacetic acid in an aqueous medium followed by removal of the carbon dioxide. These reactions readily take place at room temperature or below or elevated temperatures, e.g. up to the boiling point of the solution. The relative concentrations of the substances in question are not critical and may be dilute or concentrated, e.g. 0.2 mole to 5 moles of lysine per mole of phenoxyacetic acid. However, it is obviously advantageous to use equal molar quantities.

Upon formation of the abovementioned salt, a supersaturated solution thereof can be obtained in a number of ways, e.g., by cooling or evaporation of a saturated solution.

Water is quite suited as the solvent in the preparation of the supersaturated solution. Mixtures of water and an organic solvent may also be used. The organic solvent may be, for example, a lower alkanol or ketone, e.g. up to 6 C atoms, such as methanol, ethanol, propanol, acetone and butanone. For economical reasons, however, use is preferably made of water.

The selective crystallization can be effected by contacting the supersaturated solution with crystals of the optically active salt to be crsytallized. This contact can be brought about by seeding the supersaturated solution with the crystals concerned or by passing the supersaturated solution over a fixed a bed consisting of the optically active salt to be crystallized. In case one of the optical antipodes is present in the supersaturated solution in a larger amount than the other, the first-mentioned antipode may also crsytallize selectively owing to spontaneous crystallization. In practice, the selective crystallization is in this case preferably effected by contacting the supersaturated solution with crystals of the optically active salt to be crystallized.

The various conditions, such as the degree of supersaturation, the crystallization time and the crystallization temperature, may be widely varied in the selective crystallization and are not critical. However, crystallization temperatures between about 10° C. and 50° C. are suitable.

The process according to the invention can be realized on an industrial scale by application of known procedures in the field of the optical resolution by selective crystallization. The supersaturated solution may, for instance, be split into two equally large portions, after which the L-antipode may be selectively crystallized from one of the said portions and the D-antipode from the other. By mixing the two mother liquors left over, a mixture is obtained which can be used in the preparation of the supersaturated starting solution. Also, one may selectively crystallize one of the antipodes from the total amount of supersaturated starting solution and subsequently selectively crystallize the other antipode from the mother liquor left over, after which the mother liquor which is then left over can be used in the preparation of the supersaturated starting solution.

The mother liquor which is left in the optical resolution by selective crystallization upon removal of the crystallized optically active salt, can also be processed by other methods due to a particular feature of this invention. In regard to the salt of lysine and phenoxyactic acid, it has also been found that both the L- and D-salt are insoluble in a solution which is saturated with the racemic salt. Accordingly, the mother liquor concerned can be processed by saturating or substantially saturating with the racemic salt and effecting a separation of an optically active solid phase. The mother liquor which is left over after separating off the said solid phase from the solution can then be re-used in the preparation of the supersaturated starting solution.

According to the invention, the non-desired optically active salt of lysine and phenoxyacetic acid can be efficiently racemized by heating an aqueous solution of this salt at elevated temperatures, e.g. 150–225° C., for a period which is inversely proportional to the temperature, e.g. 1 hour at 200° C.

The optical purity of the optically active salt which is removed from the supersaturated solution by selective crystallization will depend, of course, on the conditions under which the said crystallization is effected, and these conditions may be easily selected so that the crystallized salt will have the desired optical activity. However, since it has also been found that the L- and D-salt are insoluble in a solution which is saturated with the racemic salt, it is not objectionable if the selective crystallization yields a salt with an optical purity which is lower than the one desired and the optical purity of the said salt is increased by treating the salt with a solvent and effecting the formation of a solid phase, the optical activity of which is higher than, and a liquid phase, the optical activity of which is lower than, that of the original salt. This treatment of the crystallized salt can be carried out by simply extracting the salt with a solvent or by recrystallizing it from a solvent. The salt left over upon evaporation to dryness of an optically active mother liquor may be treated in the same way. Any solvent may be employed in which the racemic salt of lysine and phenoxyacetic acid can be dissolved. Water or mixtures of water and organic solvents, as hereinbefore described, e.g. methanol, ethanol, propanol, acetone or butanone may be used.

The method for increasing the still insufficient optical purity of the optically active salt of lysine and phenoxyacetic acid by making use of the insolubility of the D- or L-salt in a saturated solution of the racemic salt can also be applied if the first-mentioned salt has not been obtained by optical resolution of the salt by selective crystallization, but in some other way such as by reaction of phenoxyacetic acid with optically active lysine which is not completely optically pure. The invention, therefore, also relates to a process for the preparation of a salt of optically active lysine which is characterized in that a mixture of unequal quantities of the D- and the L-antipode of the salt of lysine and phenoxyacetic acid is prepared and the mixture is treated with a solvent, a portion of the antipode present in the smaller quantity is separated off as a racemic modification in the dissolved state, with stimultaneous formation of a solid phase in the saturated or substantially saturated liquid phase.

After the salt of lysine and phenoxyacetic acid has been obtained by the process of the invention, in the optically pure condition required, it may, if so desired, be converted into free lysine or another lysine compound. For instance, one may convert the salt into lysine monohydrochloride by simply adding to an aqueous solution of the salt the required amount of hydrochloric acid and extracting the released phenoxyacetic acid with any suitable organic solvent, such as e.g. ether ethylacetate chloroform or an aromatic solvent such as e.g. benzene and toluene. Free lysine can be obtained from the salt of lysine and phenoxyacetic acid, for instance, by passing an aqueous solution of the salt over a basic ion exchanger. The eluate which is then obtained will contain the free lysine.

The invention will now be further elucidated by means of a number of examples, without being restricted thereto.

EXAMPLE I

For preparing the salt of lysine and phenoxyacetic acid, 76.1 g. of phenoxyacetic acid (0.5 mole) and 100 g. of water are added to an aqueous lysine solution constisting of 73.1 g. of lysine (0.5 mole) and 74.1 g. of water. The mixture is heated to 80° C. and a clear solution is obtained. The solution is then cooled to 20° C., after which the solid substance which has crystallized at that temperature is separated from the liquid. The latter is evaporated to dryness and the solid residue is added to the solid substance which has crystallized. In all, 149 g. of solid substance are thus obtained. Chromatographic analysis shows that the solid substance is lysine phenoxyacetate.

EXAMPLE II 30 g. of racemic lysine phenoxyacetate are dissolved in 43.5 g. of water with simultaneous heating until a clear solution is obtained. The resulting solution is supersaturated by cooling to 26° C. and 8 g. of solid L-lysine phenoxyacetate are then added to the supersaturated solution. The resulting suspension is stirred for about 15 minutes at 26° C. Subsequently, the suspension is passed through a filter. The solid substance filtered off is washed on the filter with 10 ml. of methanol and dried. 11.2 g. of L-lysine phenoxyacetate are thus obtained. To determine the optical purity of the said salt, it is converted into L-lysine dihydrochloride by dissolving it in water, acidifying the aqueous solution to pH=1, extracting the phenoxyacetic acid released with ether, and evaporating the aqueous solution left over to dryness. The specific rotation of the lysine dihydrochloride obtained is:

$$[\alpha]_D^{20} = +26.6 \ (c. = 10; \ 6 \ N \ HCl)$$

which corresponds to an optical purity of the L-lysine phenoxyacetate of 99.1% (98.2% by weight of the L-component by the side of 1.8% by weight of the DL-component).

EXAMPLE III 30 g. of racemic lysine phenoxyacetate are dissolved in 35.5 g. of water with simultaneous heating, until a clear solution is obtained after which the resulting solution is cooled to 26° C. Next, 4 g. of solid L-lysine phenoxyacetate are added to the supersaturated solution. The resulting suspension is stirred for about 25 minutes at a temperature of 26° C. and then filtered. The solid substance filtered off is washed on the filter with 10 ml. of methanol and subsequently dried. 7.9 g. of solid L-lysine phenoxyacetate having an optical purity of 96% are obtained.

EXAMPLE IV 30 g. of racemic lysine phenoxyacetate are dissolved in 37.7 g. of water with simultaneous heating, until a clear solution is obtained, after which the resulting solution is cooled to 35° C. At this temperature, the solution is in the supersaturated condition. Next, 4 g. of L-lysine phenoxyacetate are added to the supersaturated solution, after which the resulting suspension is stirred for about 15 minutes at 35° C. Subsequently, the suspension is passed through a filter. The solid substance filtered off is washed on the filter with 10 ml. of methanol and then dried. 5.7 g. of L-lysine phenoxyacetate having an optical purity of 98.3% are obtained.

EXAMPLE V

The mother liquor obtained by the procedure described in Example 4 after filtration of the suspension, is evaporated to remove the methanol used in the washing treatment, after which it is made up to a total weight of 62.5 g. with water. The mixture is heated until a clear solution is obtained, which is cooled to 25° C. The solution is supersaturated at this temperature. Next, 4 g. of solid D-lysine phenoxyacetate are added to it, the resulting suspension being stirred for about 20 minutes at 25° C. The solid substance is then filtered off and washed on the filter with 10 ml. of methanol. Upon drying, 5.5 g. of D-lysine phenoxyacetate with an optical purity of 95.6% are obtained.

EXAMPLE VI

At a temperature of 26° C., 11.4 g. of solid racemic lysine phenoxyacetate are added to a mother liquor consisting of 10 g. of L-lysine phenoxyacetate, 15 g. of D-lysine phenoxyacetate and 56.4 g. of water. After the mixture has been stirred at 26° C. for about 1 hour, the non-dissolved solid substance is separated from the liquid by filtration. Upon drying of the solid substance filtered off, 11.1 g. of lysine phenoxyacetate are obtained. Measurement of the specific rotation shows that this solid substance consists of 7.8 g. of D-lysine phenoxyacetate and 3.3 g. of L-lysine phenoxyacetate. The solution left over upon filtration possesses hardly any optical activity.

EXAMPLE VII

With simultaneous boiling, 10 g. of L-lysine phenoxyacetate with an optical purity of 95% are dissolved in a mixture of 26.1 g. of water and 26.1 g. of acetone. The resulting solution is slowly cooled to 22° C. The substance which has crystallized is filtered off and dried. 4.7 g., of L-lysine phenoxyacetate with an optical purity of 99.2% are obtained.

EXAMPLE VIII 13.33 g. of L-lysine phenoxyacetate with an optical purity of 85% are stirred, for 20 minutes, with a mixture of 90 g. of methanol and 10 g. of water at a temperature which is approximately equal to the boiling temperature of the methanol-water mixture. The non-dissolved solid substance is filtered off and dried. 8.98 g. of L-lysine phenoxyacetate with an optical purity of 99.1% are obtained.

What is claimed is:

1. The method of recovering an optically active lysine phenoxyacetate salt from substantially racemic lysine phenoxyacetate salt comprising the steps of dissolving said racemic salt in a solvent selected from the group consisting of water, and mixtures of water and methanol, ethanol, propanol, acetone and butanone to form a solution, supersaturating said solution, contacting the supersaturated solution with crystals of the optically active salt to be recovered, thereby effecting the formation of a crystalline mass of optically active lysine phenoxyacetate in said solution, and separating said optically active lysine phenoxyacetate.

2. A compound selected from the class consisting of L-lysine phenoxyacetate salt and D-lysine phenoxyacetate salt.

References Cited

UNITED STATES PATENTS

| 2,536,360 | 1/1951 | Emmick et al. | 260—534 L |
| 3,527,776 | 9/1970 | Uzuki et al. | 260—501.11 |

OTHER REFERENCES

Eliel, Stereochemistry of Carbon Compounds, McGraw-Hill Book Co., New York (1962), p. 48.

LEON ZITVER, Primary Examiner

M. W. GLYNN, Assistant Examiner

U.S. Cl. X.R.

260—534 L